United States Patent [19]
Alonso et al.

[11] 4,024,548
[45] May 17, 1977

[54] LIQUID ABSORBING ASSEMBLY WITH TWO POROSITIES

[75] Inventors: Victor Manuel Alonso, Roundrock, Tex.; David Roy Cialone, Richmond; George Romeo Ducharme, Lexington, both of Ky.; Paul Douglas Ginnings, Roundrock, Tex.

[73] Assignee: International Business Machines Corporation, Armonk, N.Y.

[22] Filed: June 7, 1976

[21] Appl. No.: 693,809

[52] U.S. Cl. .............................. 346/140 R; 346/75
[51] Int. Cl.² ....................................... G01D 15/18
[58] Field of Search .......................... 346/75, 140 R

[56] References Cited

UNITED STATES PATENTS 3,611,422 10/1971 Rourke .......................... 346/140 X
3,946,405 3/1976 Berry et al. ...................... 346/75 X

*Primary Examiner*—George H. Miller, Jr.
*Attorney, Agent, or Firm*—Frank C. Leach, Jr.

[57] ABSTRACT

An ink absorbing assembly has a first porous material disposed close to a paper against which ink jet droplets impact to print. Ink from an ink mist, which is produced from the droplets striking the paper, is absorbed by the first porous material and then transferred to a second porous material, which is in contact with the first porous material and of a different porosity than the first porous material. This enables the surface of the first porous material adjacent the paper in the print area to be relatively dry so as to not allow airborne particles to cling to this surface. By making the porous material of smaller porosity relatively thick in comparison with the other porous material, a relatively large quantity of ink can be absorbed by the porous material of smaller porosity without the surface of the porous material adjacent the paper in the print area becoming wet before replacement is necessary.

14 Claims, 2 Drawing Figures

LIQUID ABSORBING ASSEMBLY WITH TWO POROSITIES

Figure 1:
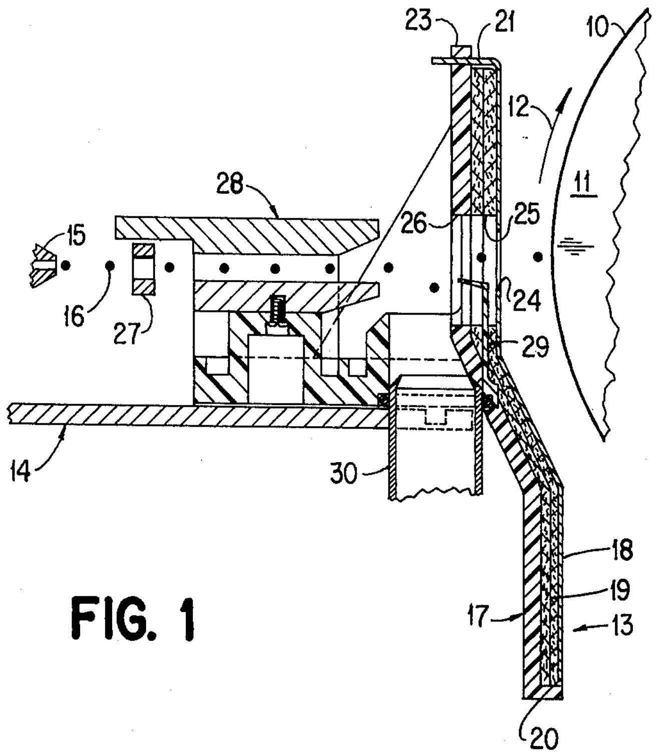

In ink jet printing, an ink mist is produced in the print area by the ink droplets of the ink jet stream striking the paper to print the desired information thereon. This mist must be controlled and/or collected to prevent the ink from the ink mist contaminating materials and parts used in the ink jet printing system.

It has previously been suggested on pages 4074 and 4075 of volume 18, No. 12 (May, 1976) of the IBM Technical Disclosure Bulletin to collect this ink mist by absorption of the ink into a single layer of porous material. However, this single layer of porous material has not been capable of keeping the surface adjacent the paper relatively dry for a relatively long period of time. That is, after a relatively short period of time such as 2 days, for example, the surface of the single layer of material closest to the print area becomes wet so as to allow airborne particles to adhere thereto. As a result, early replacement is necessary. This relatively short period of time is not satisfactory for commercial ink jet printing systems.

By the surface of the single layer of porous material becoming wet adjacent the paper on which printing is occurring, airborne particles such as particles of lint and fiber from the paper adhere to the surface of the porous material. As a result, the size of the opening in the single layer of porous material through which the ink droplets pass in moving from the nozzle to the paper is reduced to affect the print quality since all of the droplets are unable to pass therethrough along their desired paths.

The present invention solves the problem of preventing the surface of the porous material adjacent the paper from becoming wet while storing a relatively large quantity of ink by utilizing two layers of porous materials of different porosity. As a result of making the layer of the porous material remote from the paper of smaller pore sizes than the layer of the porous material adjacent the paper, the capillary forces produced by the smaller porosity of the second porous material cause the ink to be transferred from the first porous material, which is closest to the paper on which printing is occurring by the ink droplets striking the paper, to the second porous material. This causes the ink in the first porous material to flow to the second porous material so that the surface of the first porous material adjacent the paper on which printing is occurring does not become wet until the second porous material has become saturated and then the first porous material becomes saturated. Thus, the second porous material is saturated first.

Through controlling the length of time that the ink absorbing assembly of the present invention is employed, replacement is made before the second porous material, which is remote from the paper on which printing is occurring, becomes saturated. Therefore, the surface of the first porous material adjacent to the paper on which printing is occurring does not become wet since it does not become saturated. Accordingly, there is no attraction of particles such as lint and the like from the paper to cause reduction of the size of the opening in the first porous material through which the ink droplets pass to strike the paper on which printing occurs.

An object of this invention is to provide an assembly for absorbing ink of an ink mist produced by ink droplets of an ink jet stream striking a recording medium without the absorbing surface of the assembly becoming wet for a relatively long period of time.

Another object of this invention is to provide a unique arrangement of two layers of porous material of different porosity for absorbing ink of an ink mist produced by ink droplets of an ink jet stream striking a recording medium without the surface of porous material adjacent to the ink mist becoming wet for a relatively long period of time.

A further object of this invention is to provide an arrangement for absorbing a liquid from a mist without the absorbing surface becoming wet for a relatively long period of time. The foregoing and other objects, features, and advantages of the invention will be apparent from the following more particular description of a preferred embodiment of the invention as illustrated in the accompanying drawing.

In the drawing:

FIG. 1 is a schematic side sectional view, partly in elevation, of an ink jet printing system including the ink absorber of the present invention.

Figure 2:
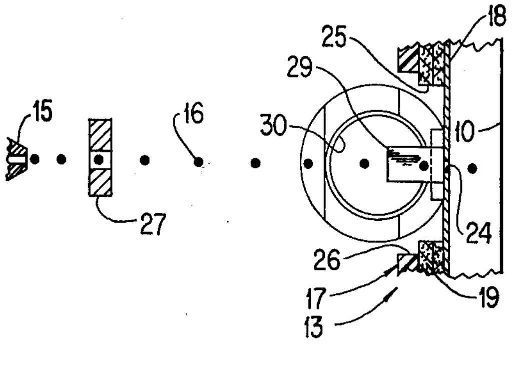

FIG. 2 is a fragmentary schematic horizontal cross sectional view, partly in plan, of the ink jet printing system of FIG. 1 with parts omitted but including the ink absorber of the present invention. Referring to the drawing and particularly FIG. 1, there is shown a recording medium such as a paper 10 mounted on a drum 11 for rotating in the direction of an arrow 12. An ink mist absorbing assembly 13 is mounted on a carrier 14, which has an ink jet nozzle 15 carried thereby to supply an ink stream 16 of droplets for application to the paper 10 to print thereon.

The ink mist absorbing assembly 13 includes a support frame 17, which is formed of a suitable plastic material such as polypropylene, for example, a first porous material 18, and a second porous material 19. The first porous material 18 has a greater porosity than the second porous material 19 since the pores in the first porous material 18 are larger than those in the second porous material 19.

The support frame 17 has a bottom flange 20 supporting the bottom edges of the first porous material 18 and the second porous material 19. The support frame 17 also has side flanges (not shown) adjacent the sides of the first porous material 18 and the second porous material 19.

The first porous material 18 as an upper flange 21 overlying the upper edges of the second porous material 19 and the support frame 17. The upper flang 21 of the first porous material 18 has slots therein to receive tabs 23 on the upper end of the support frame 17 to connect the first porous material 18 to the support frame 17. The first porous material 18 and the second porous material 19 are joined at spaced points by plastic tennons (not shown) from the support frame 17 passing through aligned openings in the porous materials 18 and 19 and then having a head formed thereon.

The first porous material 18 has a rectangular shaped slot 24 therein to enable the droplets of the ink stream 16 to pass therethrough to strike the paper 10 to print thereon. The second porous material 19 is cut away to provide an opening 25 therein for the ink stream 16 and larger than the slot 24. The support frame 17 is cut away to have an opening 26 larger than the opening 25 for the ink stream 16.

The first porous material 18 is preferably formed of a stainless steel metal felt sold by Fluid Dynamics, a division of Brunswick Corporation, Cedar Knolls, N.J. under the trademark Dynalloy X. This material preferably has a filter rating of 22 microns mean and 40 microns absolute but could have a filter rating as low as 1 microns mean and 3 microns absolute.

The first porous material 18 also could be formed of a porous plastic material. One suitable example of the porous plastic material is a high density polyethylene of thirty-five microns size sold under the trademark Porex by Porex Material Corporation.

The first porous material 18 could be formed of any other porous material that is not corrosive. This is necessary to prevent clogging of the pores in the first porous material 18 to prevent the flow of the ink from the ink mist through the first porous material 18 to the second porous material 19.

The second porous material 19 is formed of a material capable of absorbing the ink from the first porous material 18 because of its porosity being less than the porosity of the first porous material 18. Since the capillary force increases with the decreasing size of the pores, the second porous material 19 absorbs the ink with more force to allow the first porous material 18 to remain dry on its surface adjacent the paper 10.

One suitable example of the porous material 19 is one layer or a plurality of layers of fibrous blotter material. For example, the fibrous blotter material can be a borosilicate microfiber glass with an acrylic resin binder. Any other material capable of absorbing ink from the first porous material 18 because of having a smaller porosity and being non-corrosive may be utilized.

The rate of transfer of the ink from the first porous material 18 to the second porous material 19 is dependent upon the viscosity of the ink, the pore size openings of the porous materials 18 and 19, and the thickness of the first porous material 18. Thus, the first porous material 18 is relatively thin to enable a rather rapid rate of transfer of the ink from the first porous material 18 to the second porous material 19. This is necessary to prevent evaporation of the water, which comprises approximately eighty per cent of the ink. If the ink was not transferred rapidly from the first porous material 18 to the second porous material 19, the water would evaporate and would no longer be able to act as a carrier to transfer the ink solids from the first porous material 18 to the second porous material 19. To prevent attraction of the lint and the like to the first porous material 18, it is desired that its surface, which is adjacent to the paper 10, remain as dry as possible, and this is accomplished by the transfer of the ink from the first porous material 18 to the second porous material 19.

If the surface of the first porous material 18 closest to the paper 10 is not relatively dry, the ink on this surface would collect lint and the like from the paper 10 to reduce the size of the slot 24 in the first porous material 18. This would affect the ink stream 16 to prevent at least some of the desired printing. The lint and the like are dislodged from the paper 10 in the print area because of vibrations of the paper 10 produced in advancing it in the direction of the arrow 12.

The second porous material 19 is preferably several times thicker than the first porous material 18 to provide a relatively large reservoir for absorbing the ink. Thus, as the thickness of the second porous material 19 increases, its ink absorbing capacity increases.

To direct the droplets of the ink stream 16 to desired areas of the paper 10, the droplets of the ink stream 16 are charged to varying amounts by suitable charging means 27 after leaving the nozzle 15 and then deflected by suitable deflecting means 28 in the well-known manner. Any droplets, which have not been charged, will strike a gutter 29 and be deflected to a gutter tube 30 for return to the nozzle 15 in the well-known manner. Thus, the desired printing by ink droplets in the well-known manner is obtained.

Since the ink droplets of the ink stream 16 forming the ink mist are charged to varying degrees, this charge tends to accumulate on the surface of the first porous material 18 adjacent the paper 10. Accordingly, a grounding strap (not shown) is mounted on the support frame 17 and connected to the first porous material 18 through the second porous material 19 to prevent any charge build up on the surface of the first porous material 18 adjacent the paper 10.

While the present invention has shown and described the second porous material 19 as being thicker than the first porous material, it should be understood that such is not necessary. However, the increased thickness of the second porous material 19 enables a larger quantity of ink to be absorbed.

As an example of the relative thicknesses and spacings, the distance from the surface of the first porous material 18 to the paper 10 is 0.1 inches. The first porous material 18 has a thickness of 0.012 inches and the second porous material 19 has a thickness of 0.05 inches. The support frame 17 has a thickness of 0.04. The closest distance between the gutter 29 and the adjacent surface of the first porous material 18 is 0.015. The slot 24 has a width of 0.070 inches and a height of 0.25 inches.

While the present invention has been shown and described as having a second porous material 19 of a smaller porosity than the first porous material 18, it should be understood that the first porous material 18 could have a smaller porosity than the second porous material 19. With this arrangement, the first porous material 18 would become saturated initially because of its smaller porosity. However, upon saturation of the first porous material 18, the surface of the first porous material 18 adjacent the paper 10 would not become wet because the ink would migrate or flow to the second porous material 19 since the second porous material 19 exerts a capillary force on the ink within the first porous material 18 and there is no force being exerted on the ink within the first porous material 18 by the ambient having the ink mist.

With this arrangement, the second porous material 19 becomes saturated after the first porous material 18. After this occurs, the ink would emerge from the surface of the second porous material 19 remote from the paper 10 rather than from the surface of the first porous material 18 adjacent the paper 10 if the assembly 13 is not replaced.

While the present invention has shown and described the first and second porous materials 18 and 19 as being different materials, it should be understood that they could be formed of the same material if desired but with different porosities. Thus, any suitable non-corrosive material could be employed for both the first porous material 18 and the second porous material 19 as long as the first porous material 18 and the second porous material 19 have different porosities.

While the present invention has been shown and described with respect to an ink jet printing system using charged droplets, it should be understood that any other ink jet printing system could be employed if desired. Thus, for example, the present invention could be used with an electromagnetic ink jet printing system.

An advantage of this invention is that it protects components of an ink jet printing system from ink mist contamination. Another advantage of this invention is that ink of an ink mist produced by ink jet printing is absorbed without the entry surface of the ink becoming wet for a relatively long period of time.

While the invention has been particularly shown and described with reference to a preferred embodiment thereof, it will be understood by those skiled in the art that various changes in form and details may be made therein without departing from the spirit and scope of the invention.

What is claimed is:

1. An assembly for absorbing ink from an ink mist produced by ink droplets of an ink jet stream striking a recording medium including:

a first porous material disposed adjacent the recording medium to absorb ink from the ink mist produced by the ink droplets striking the recording medium;

and a second porous material disposed in contact with said first porous material and having a smaller porosity than said first porous material to absorb ink from said first porous material.

2. The assembly according to claim 1 in which each of said first and second porous materials is non-corrosive.

3. The assembly according to claim 1 in which said first porous material is a metallic porous material.

4. The assembly according to claim 1 in which said first porous material is a plastic porous material.

5. The assembly according to claim 1 in which said second porous material is a fibrous material.

6. The assembly according to claim 1 in which said second porous material is thicker than said first porous material..

7. The assembly according to claim 6 in which each of said first and second porous materials is non-corrosive.

8. The assembly according to claim 6 in which said first porous material is a metallic porous material.

9. The assembly according to claim 6 in which said first porous material is a plastic porous material.

10. The assembly according to claim 6 in which said second porous material is a fibrous material.

11. An assembly for absorbing ink from an ink mist produced by ink droplets of an ink jet stream striking a recording medium including;

a first porous material disposed adjacent the recording medium to absorb ink from the ink mist produced by the ink droplets striking the recording medium;

and a second porous material disposed in contact with said first porous material and having a different porosity than said first porous material to absorb ink from said first porous material.

12. The assembly according to claim 11 in which each of said first and second porous materials is non-corrosive.

13. The assembly according to claim 11 in which one of said first and second porous materials is a metallic porous material and the other of said first and second porous materials is a fibrous material.

14. The assembly according to claim 11 in which one of said first and second porous materials is a plastic porous material and the other of said first and second porous materials is a fibrous material.

* * * * *